United States Patent
Zheng et al.

(10) Patent No.: US 9,242,901 B2
(45) Date of Patent: Jan. 26, 2016

(54) REFINED WHITE CERAMIC MATERIAL AND METHOD FOR PREPARING SAME

(75) Inventors: Hongyu Zheng, Shijiazhuang (CN); Pengyuan Shi, Shijiazhuang (CN); Huajiang Jin, Shijiazhuang (CN); Caihua Ren, Shijiazhuang (CN); Bingqu Zhang, Shijiazhuang (CN); Jinli Zhang, Shijiazhuang (CN)

(73) Assignee: THE 13TH RESEARCH INSTITUTE OF CHINA ELECTRONICS TECHNOLOGY GROUP CORPORATION, Shijiazhuang (CN)

( * ) Notice: Subject to any disclaimer, the term of this patent is extended or adjusted under 35 U.S.C. 154(b) by 13 days.

(21) Appl. No.: 14/127,883

(22) PCT Filed: Feb. 17, 2012

(86) PCT No.: PCT/CN2012/071284
§ 371 (c)(1),
(2), (4) Date: Dec. 19, 2013

(87) PCT Pub. No.: WO2013/097324
PCT Pub. Date: Jul. 4, 2013

(65) Prior Publication Data
US 2014/0113800 A1    Apr. 24, 2014

(30) Foreign Application Priority Data
Dec. 31, 2011    (CN) .......................... 2011 1 0458182

(51) Int. Cl.
C04B 35/119    (2006.01)
C04B 35/111    (2006.01)
C04B 35/626    (2006.01)
C04B 35/634    (2006.01)

(52) U.S. Cl.
CPC ............. C04B 35/119 (2013.01); C04B 35/111 (2013.01); C04B 35/6261 (2013.01); C04B 35/634 (2013.01); C04B 2235/3206 (2013.01); C04B 2235/3208 (2013.01); C04B 2235/3232 (2013.01); C04B 2235/3244 (2013.01); C04B 2235/3418 (2013.01); C04B 2235/786 (2013.01); C04B 2235/85 (2013.01); C04B 2235/9661 (2013.01)

(58) Field of Classification Search
CPC .. C04B 35/111; C04B 35/119; C04B 35/6261
See application file for complete search history.

(56) References Cited

U.S. PATENT DOCUMENTS

| | | | | |
|---|---|---|---|---|
| 4,595,665 | A * | 6/1986 | Takayama et al. | 501/128 |
| 8,981,630 | B2 * | 3/2015 | Shikata et al. | 313/46 |
| 2003/0088979 | A1 * | 5/2003 | Tomita et al. | 29/888.02 |
| 2010/0273632 | A1 | 10/2010 | Wang et al. | |
| 2013/0181593 | A1 * | 7/2013 | Shikata et al. | 313/46 |

FOREIGN PATENT DOCUMENTS

| | | |
|---|---|---|
| CN | 1415579 | 5/2003 |
| CN | 101565302 | 10/2009 |

OTHER PUBLICATIONS

Li et al., "Research progress in ceramic substrate material for electronic packaging," The Chinese Journal of Nonferrous Metals, Jul. 2010, vol. 20, No. 7, pp. 1365-1374, English language abstract provided.
Huang, "Effects of oxide doping on volume density of alumina ceramics," Annual Report of China Academy of Engineering Physics, Dec. 2003, pp. 479-480.
International Search Report of PCT/CN2012/071264, dated Jul. 12, 2012, 4 pages total.

* cited by examiner

*Primary Examiner* — Karl Group
(74) *Attorney, Agent, or Firm* — Hamre, Schumann, Mueller & Larson, P.C.

(57) ABSTRACT

Disclosed is a refined white ceramic material, which belongs to the field of ceramic materials for component packaging, and comprises the following raw materials by weight in percentage: aluminum oxide 87-93, magnesium oxide 0.8-5, silicon dioxide 1-6, calcium oxide 0.6-4, titanium dioxide 0.01-0.5, and zirconium dioxide 0.5-3. The method for preparing same comprises: (1) washing aluminum oxide grinding balls and a ball-milling tank, and drying for later use; (2) weighing a solvent NP-10 of 0.5-4 by weight in percentage, and adding the solvent into the ball-milling tank; (3) weighing raw materials, adding the raw materials into the ball-milling tank, and performing ball milling for 72±0.5 h. By means of the refined white ceramic material of the present invention, the obtained ceramic grains have even sizes, small surface roughness, and high fracture resistance performance of ceramic body.

2 Claims, 2 Drawing Sheets

REFINED WHITE CERAMIC MATERIAL AND METHOD FOR PREPARING SAME

TECHNICAL FIELD

The present invention relates to a ceramic material and the preparation method thereof, in particular to a refined white ceramic material and the preparation method thereof.

BACKGROUND

In the technical field of microelectronics, the device packaging should meet the requirements for denseness, lightness and thinness, rapidness, and fast heat dissipation. The ceramic packaging meets these requirements, which has the advantage of good air-tight performance over other styles of packaging, so it is employed in the process of advantaged sealing chip packaging, in particular, for the packaging of military components, the highly reliability of ceramic packaging is irreplaceable compared to the metal packaging and the plastic packaging.

The mechanical property of ceramic materials is the behavioral characteristic of the materials when they are deformed or broken under mechanical force, including mainly flexibility, plasticity, fracture property, creep, fatigue and impact property, wherein the fracture property is the most important one to the ceramic materials. For most inorganic materials, especially the functional inorganic materials with complex conditions under use, the mechanical property is one of the primary factors should be taken into consideration in engineering application, and affecting factors of the matrix material mechanical property and the optimization of design thereof, are significantly important to the research and development and the promotion of the use of the product.

SUMMARY

The present invention provides a refined white ceramic material and the preparation method thereof, the ceramic product made of the ceramic material according to the present invention has even sizes of grains, small surface roughness, and high fracture resistance performance.

A technical problem resolved by the present invention is:

a refined white ceramic material, which comprises the following raw materials in parts by weight: 87-93 parts of aluminum oxide, 0.8-5 parts of magnesium oxide, 1-6 parts of silicon dioxide, 0.6-4 parts of calcium oxide, 0.01-0.5 parts of titanium dioxide, 0.5-3 parts of zirconium dioxide.

The refined white ceramic material according to the present invention is made by means of ball grinding the mix of a solvent and a raw material.

The present invention further provides a method for producing a refined white ceramic material, which comprises the following steps:

(1) cleaning the alumina grinding balls and ball mill jar, drying for later use;

(2) weighing 0.5-4 parts by weight of NP-10 as a solvent, and adding the solvent into the ball mill jar;

(3) weighing following raw materials in parts by weight: 87-93 parts of aluminum oxide, 0.8-5 parts of magnesium oxide, 1-6 parts of silicon dioxide, 0.6-4 parts of calcium oxide, 0.01-0.5 parts of titanium dioxide and 0.5-3 parts of zirconium dioxide, and adding them into the ball mill jar, then performing ball grinding for 72±0.5 h.

Wherein the process of cleaning alumina grinding balls and ball mill jar in the step (1) is: the alumina grinding balls are added into the cleaned ball mill jar, then an absolute ethanol is added into the ball mill jar in such an amount that the alumina grinding balls are just submerged completely, then the resulted mix is subjected to ball grind with sealing for 3 h±0.5 h.

A new ceramic material has been obtained by adjusting the formulation in the embodiment of the present invention, because of the interaction of the magnesium oxide, silicon dioxide, calcium oxide, titanium dioxide and zirconium dioxide in the raw material, the growth of crystal grains in the sintering process can be effectively inhibited. The finer the grain size is, the greater is the proportion of grain boundary in the material. In fact, the bonding force between the atoms at the grain boundary is weaker than that of the interior atoms of the grain, for example, the internal fracture surface energy of the polycrystalline grains of $Al_2O_3$ is 46 $J/m^2$, and the surface energy $\gamma$int of the grain boundary is only 18 $J/m^2$. But in fact, the greater the proportion of grain boundary with low binding energy is, the higher is the strength of the material. That is because from a microscopic point of view, there are two kinds of fracture for material: intergranular fracture and transgranular fracture, for a certain material composition, when intergranular fracture takes place, the crack extends in a tortuous path, and the finer the grain is, the longer is the path that the crack extends; furthermore the bridging and interlocking action of the grain at the surface of the crack will consume excess energy, as a result the material with more crystal grain boundaries will have higher strength.

The solvent NP-10 is nonylphenol polyoxyethylene ether 10, it acts as a dispersing agent when mixed with other material to prevent the agglomeration of the mixed powder, and plays the role of dispersing particles.

Currently the packaging shells for electronic products are often made of white aluminum oxide ceramic materials, and it is necessary to improve the performance of fracture strength of these materials. The fracture strength of the polycrystalline ceramic material complies with the Hall-Petch relationship:

$$\sigma_f = \sigma_0 + kd^{1/2}$$

wherein, the $\sigma_0$ is strength of the infinite monocrystal; k is a coefficient; and d is the grain diameter.

If the initial crack is restricted by the crystal grains, the size thereof will correlate to the grain size, the finer the grain is, the smaller size the initial crack will have, so the relationship between the brittle fracture and the grain size can be rewritten as:

$$\sigma_f = k_2 d^{-1/2}$$

The performance of fracture strength mainly depends on the chemical composition, grain size, porosity, crystal structure type, micro-crack, glass phase, surface roughness and other factors of the material. For the packaging ceramic, the chemical composition thereof may be restricted by its function, so the influence factors such as grain size, grain boundary phase, surface roughness and the like are primary factors.

1. Grain Size

For polycrystalline ceramic material, the finer the grain is, the higher is the fracture strength, which is similar to the law of the metal.

When the grain has a small size of magnitude of nanometer, the relationship between the strength and the size of the material will be complicated and will not necessarily comply with the Hall-Petch relationship, so smaller is better is not suitable for the grain size.

By combining literatures and research experience in this field it can be seen that the distribution of the grain size is mainly in the range of 2-3 μm, the maximum grain size is no more than 5 μm, and there are no too large or too small grains, this kind of distribution of the grain size is reasonable.

2. Grain Boundary Phase

A sintering additive is often added when the ceramic material is sintered, in order to form a certain amount of low-melting phases to promote densification, as the sinter is completed these low-melting phases are left to form the grain boundary phase at the grain boundary or the corners. The composition, nature and the amount (thickness) of the grain boundary phase have great influence on the strength. The presence of grain boundary phase is adverse to the strength because the grain boundary phase is reach in impurities or most of them are amorphous state, typically they have low fracture surface energy, low strength, and they are brittle.

3. Surface Roughness

The surface roughness of the samples may significantly affect the strength of the ceramic material, the smoother the surface is, the fewer defects the material has, the smaller the defect size is, the higher strength the material has. Griffith carried out a strength test on the glass rod and found that the bent strength of the just drawn glass rod (6 GPa) was significantly higher than that put in the air for several hours after drawn (0.4 GPa), this phenomenon is mainly induced by the surface cracking caused by the atmosphere corrosion. In another example, after the surface defects of NaCl is dissolved with warm water, its strength increases from 5M Pa to 1.6 G Pa. It can be seen that the surface defects have significant influence on the strength.

The SEM analysis diagrams of the ceramic material prepared by the present method and the raw ceramic material are shown in FIG. 1 and FIG. 2 separately, it can be seen from FIG. 1 and FIG. 2 that the improved ceramic crystal grains have even sizes, and there is no significant big grown grain found, the grains are bonded together tightly, and the distribution and the angles of the grain boundaries are reasonable.

The ceramic material according to the present invention has been tested by Single Edge Notched Beam, the result thereof is compared to that of the raw ceramic materials, and the comparison diagram is shown in FIG. 3, which shows that the strength of the ceramic material according to the present invention increases by about 65%, the fracture resistance performance of the ceramic body has been significantly improved.

The beneficial effect of the above technical solution is as follows:

1. Because of the interaction of the magnesium oxide, silicon dioxide, calcium oxide, titanium dioxide and zirconium dioxide in the raw material, the growth of crystal grains in the sintering process can be effectively inhibited. The finer is the grain size, the greater is the proportion of grain boundary in the material, and the greater is the proportion of grain boundary with low binding energy, the higher strength the material has.

2. By adding NP-10 as a solvent in the process of ball grinding, the particles can be effectively dispersed, and the agglomeration of the mixed powder may be prevented.

3. The ceramic product made by sintering of the ceramic powder according to the present invention has small roughness on the surface, and with much smoother surface, less defects and smaller size of the defects, the strength of the product is much higher.

BRIEF DESCRIPTION OF THE DRAWINGS

The present invention will be described in detail with reference to the drawings and the Examples.

DETAILED DESCRIPTION OF THE PREFERRED EMBODIMENTS

EXAMPLE 1

Figure 1:
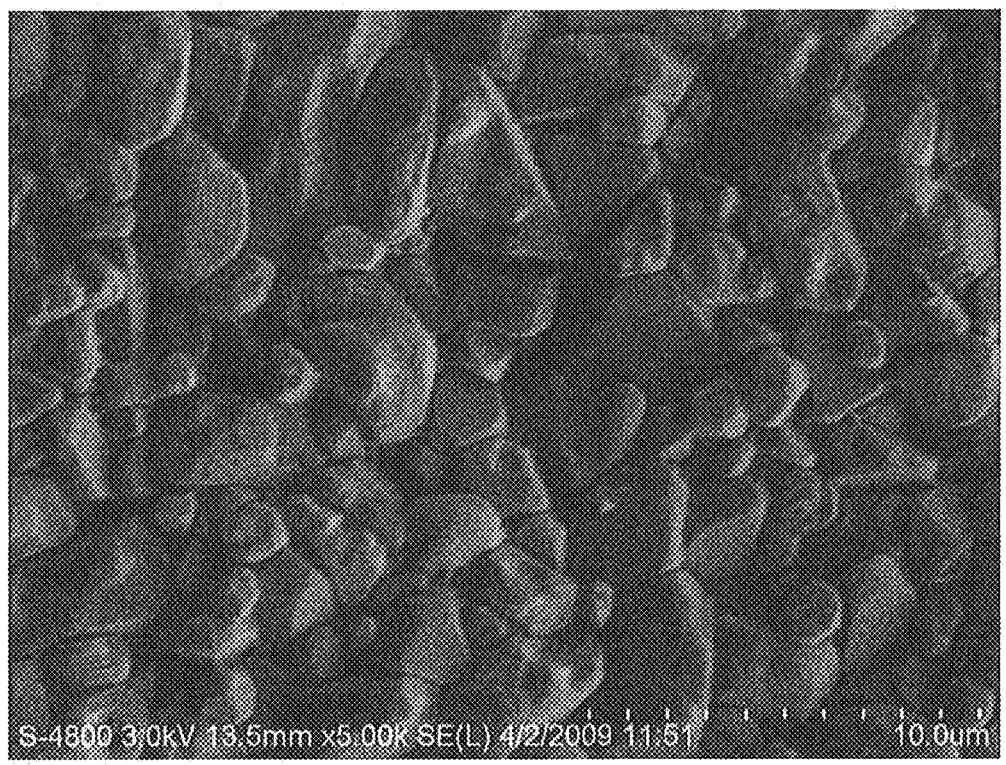
FIG. 1 shows the SEM analysis diagram of the ceramic material according to the present invention.
Figure 2:
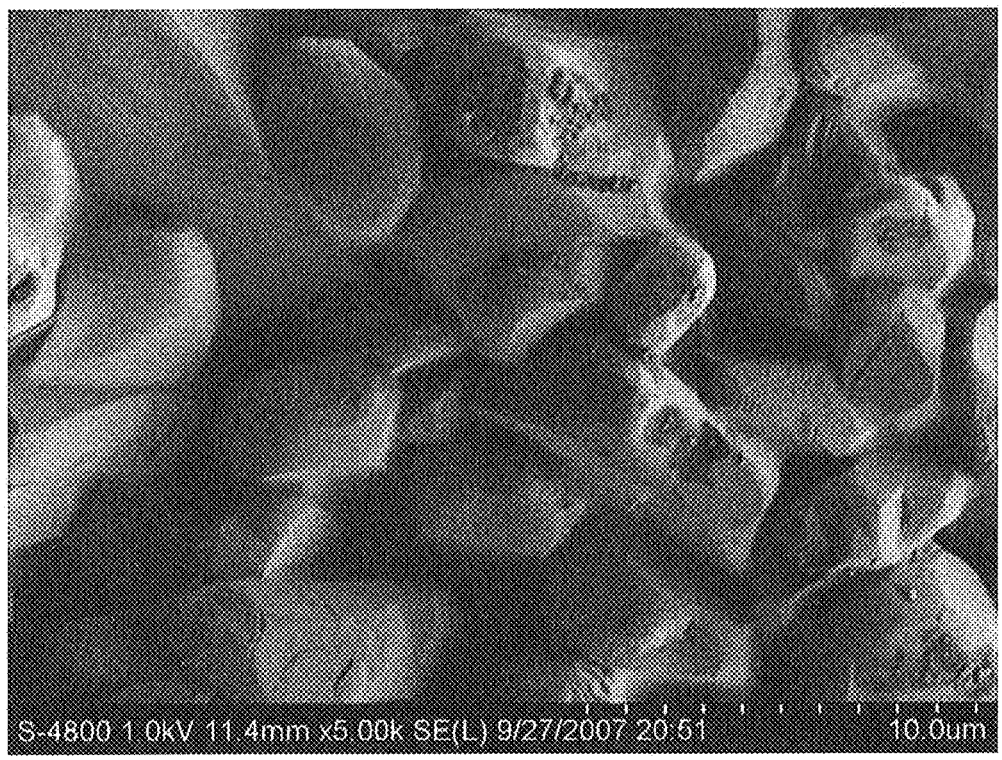
FIG. 2 shows the SEM analysis diagram of the raw ceramic material.
Figure 3:
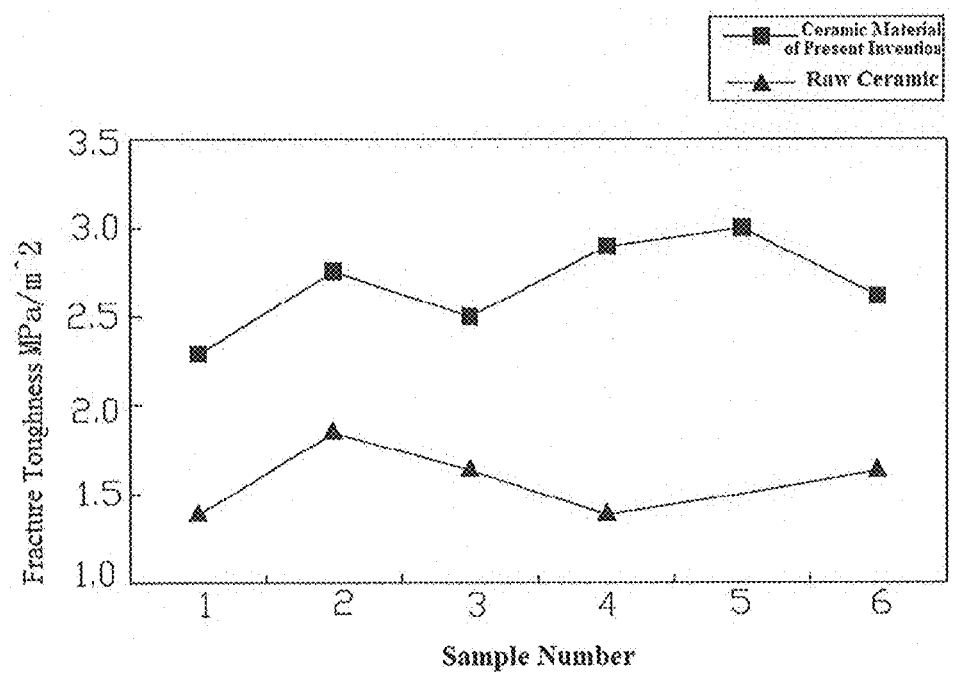
FIG. 3 shows the comparison diagram of the fracture strength test of the ceramic material according to the present invention and the raw ceramic material.

(1) A number of alumina grinding balls were added into the ball mill jar, then an absolute ethanol was added into the ball mill jar in such an amount that the alumina grinding balls were just submerged completely, and the mix was subjected to ball grind with sealing for 3 h, then poured out the ethanol, and dry them for later use;

(2) Two parts (by weight) of solvent NP-10 was weighed and added into the ball mill jar;

(3) The following raw materials in parts by weight were weighed: 90 parts of aluminum oxide, 0.8 parts of magnesium oxide, 6 parts of silicon dioxide, 1.5 parts of calcium oxide, 0.01 parts of titanium dioxide and 2 parts of zirconium dioxide, and they were added into the ball mill jar, subjected to ball grinding for 72 h.

EXAMPLE 2

(1) A number of alumina grinding balls were added into the ball mill jar, then an absolute ethanol was added into the ball mill jar in such an amount that the alumina grinding balls were just submerged completely, and the mix was subjected to ball grind with sealing for 3.5 h, then poured out the ethanol, and drying them for later use;

(2) 0.5 parts (by weight) of solvent NP-10 was weighed and added into the ball mill jar;

(3) the following raw materials in parts by weight were weighed: 87 parts of aluminum oxide, 3 parts of magnesium oxide, 1 parts of silicon dioxide, 4 parts of calcium oxide, 0.25 parts of titanium dioxide and 3 parts of zirconium dioxide, and they were added into the ball mill jar, the mix was subjected to ball grinding for 72.5 h.

EXAMPLE 3

(1) A number of alumina grinding balls were added into the ball mill jar, then an absolute ethanol was added into the ball mill jar in such an amount that the alumina grinding balls were just submerged completely, and the mix was subjected to ball grind with sealing for 2.5 h, then poured out the ethanol, and drying them for later use;

(2) Four parts (by weight) of solvent NP-10 were weighed and added into the ball mill jar;

(3) The following raw materials in parts by weight were weighed: 93 parts of aluminum oxide, 5 parts of magnesium oxide, 2.5 parts of silicon dioxide, 0.6 parts of calcium oxide, 0.5 parts of titanium dioxide and 0.5 parts of zirconium dioxide, and they were added into the ball mill jar, the mix was subjected to ball grinding for 71.5 h.

What is claimed is:

1. A method for producing a refined white ceramic material, comprising the steps of:

(1) cleaning the alumina grinding balls and ball mill jar, and drying the balls and the mill jar for later use;

(2) weighing 0.5-4 parts by weight of nonylphenol polyoxyethylene ether as a solvent, and adding the solvent into the ball mill jar;
(3) weighing the following raw materials in parts by weight: 87-93 parts of aluminum oxide, 0.8-5 parts of magnesium oxide, 1-6 parts of silicon dioxide, 0.6-4 parts of calcium oxide, 0.01-0.5 parts of titanium dioxide and 0.5-3 parts of zirconium dioxide, and adding the raw materials into the ball mill jar, performing ball grinding for 72±0.5 h.

2. The method for producing a refined white ceramic material of claim 1, wherein the process of cleaning the alumina grinding balls and ball mill jar in step (1) comprises: adding the alumina grinding balls into the cleaned ball mill jar; adding absolute ethanol into the ball mill jar in such an amount that the alumina balls are submerged; and grinding the alumina balls for 3 h±0.5 h.

\* \* \* \* \*

UNITED STATES PATENT AND TRADEMARK OFFICE
CERTIFICATE OF CORRECTION

PATENT NO. : 9,242,901 B2
APPLICATION NO. : 14/127883
DATED : January 26, 2016
INVENTOR(S) : Zheng et al.

It is certified that error appears in the above-identified patent and that said Letters Patent is hereby corrected as shown below:

Title page of the patent, (86), "PCT No.: PCT/CN2012/071284" should read
--PCT No.: PCT/CN2012/071264--

Signed and Sealed this
Second Day of August, 2016

Michelle K. Lee
*Director of the United States Patent and Trademark Office*